United States Patent [19]

Lee et al.

[11] Patent Number: 5,444,815
[45] Date of Patent: Aug. 22, 1995

[54] MULTI-ZONE LAMP INTERFERENCE CORRECTION SYSTEM

[75] Inventors: Yong J. Lee, Richardson; Mehrdad M. Moslehi, Dallas, both of Tex.

[73] Assignee: Texas Instruments Incorporated, Dallas, Tex.

[21] Appl. No.: 168,433

[22] Filed: Dec. 16, 1993

[51] Int. Cl.⁶ .......................... H05B 3/62; H01L 21/00
[52] U.S. Cl. ..................... 392/416; 392/418; 118/724; 374/126
[58] Field of Search ................ 392/416, 418; 219/405, 219/411, 390, 385, 412, 413; 250/492.1, 495.1; 364/557, 571.03; 118/724, 725, 50.1; 437/247, 248; 315/149-159; 374/126-128

[56] References Cited

U.S. PATENT DOCUMENTS

| | | | |
|---|---|---|---|
| 3,627,590 | 12/1971 | Mammel | 437/82 |
| 4,047,496 | 9/1977 | McNeilly et al. | 118/49.1 |
| 4,097,226 | 6/1978 | Erikson et al. | 432/120 |
| 4,356,384 | 10/1982 | Gat | 392/418 |
| 4,555,273 | 11/1985 | Collins et al. | 437/22 |
| 4,760,244 | 7/1988 | Hokynar | 219/390 |
| 4,836,138 | 6/1989 | Robinson et al. | 118/666 |
| 4,859,832 | 8/1989 | Uehara et al. | 219/411 |
| 4,890,245 | 12/1989 | Yomoto et al. | 374/121 |
| 4,956,538 | 9/1990 | Moslehi | 219/405 |
| 4,979,133 | 12/1990 | Arima et al. | 374/121 |
| 4,979,134 | 12/1990 | Arima et al. | 374/126 |
| 4,984,902 | 1/1991 | Crowley et al. | 374/126 |
| 5,098,198 | 3/1992 | Nulman et al. | 374/126 |
| 5,102,231 | 4/1992 | Loewenstein et al. | 374/129 |
| 5,108,792 | 4/1992 | Anderson et al. | 118/725 |
| 5,179,677 | 1/1993 | Anderson et al. | 392/411 |
| 5,180,226 | 1/1993 | Moslehi | 374/127 |
| 5,233,163 | 8/1993 | Mieno et al. | 219/390 |
| 5,268,989 | 12/1993 | Moslehi et al. | 392/418 |
| 5,367,606 | 11/1994 | Moslehi et al. | 392/418 |

FOREIGN PATENT DOCUMENTS

92/12405  7/1992  WIPO.

Primary Examiner—John A. Jeffery
Attorney, Agent, or Firm—Jacqueline J. Garner; Richard L. Donaldson; William E. Hiller

[57] ABSTRACT

A multi-zone lamp interference correction system and method for accurate pyrometry-based multi-point wafer temperature measurement in a multi-zone rapid thermal processing system comprises a plurality of lamps arranged in zones. A dummy lamp is also provided for each zone. Each lamp heating zone and its associated dummy lamp are connected to a controllable power supply. The radiance from a particular zone in the wafer combined with the lamp interference associated with the zone is measured using a first plurality of sensors. The lamp radiation from the plurality of dummy lamps are monitored using a second plurality of sensors. For each zone, a lamp interference component is removed from the wafer temperature sensor signal. The lamp interference components are based on geometry factors and the lamp radiance signals.

18 Claims, 7 Drawing Sheets

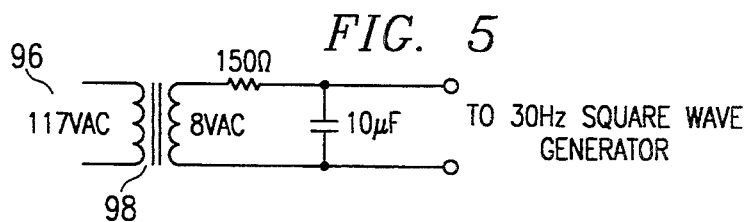
FIG. 5
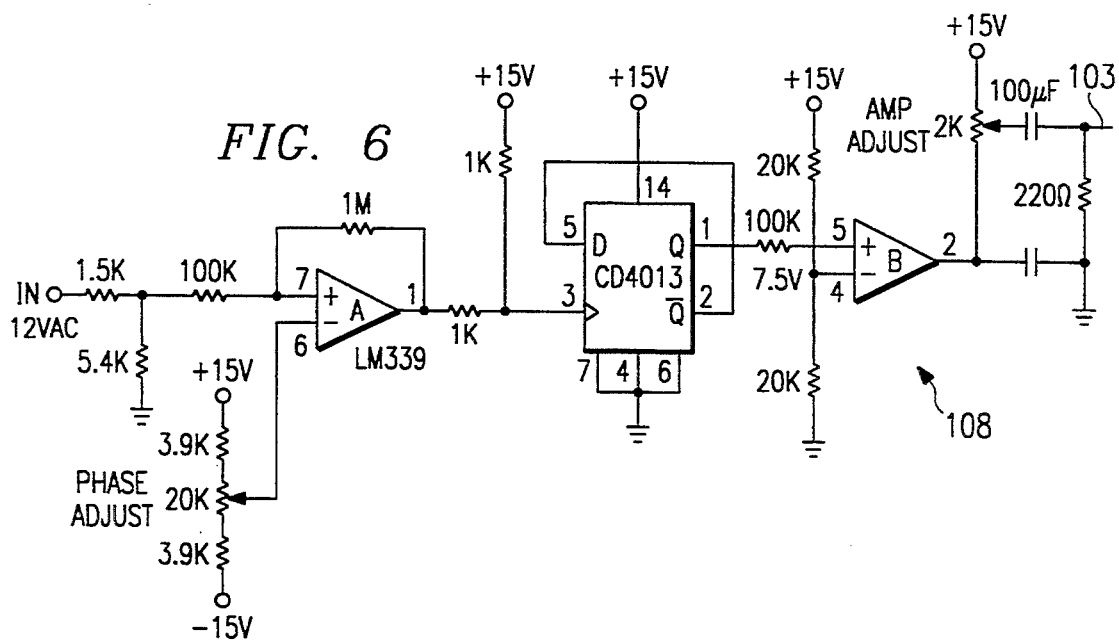
FIG. 6
FIG. 7
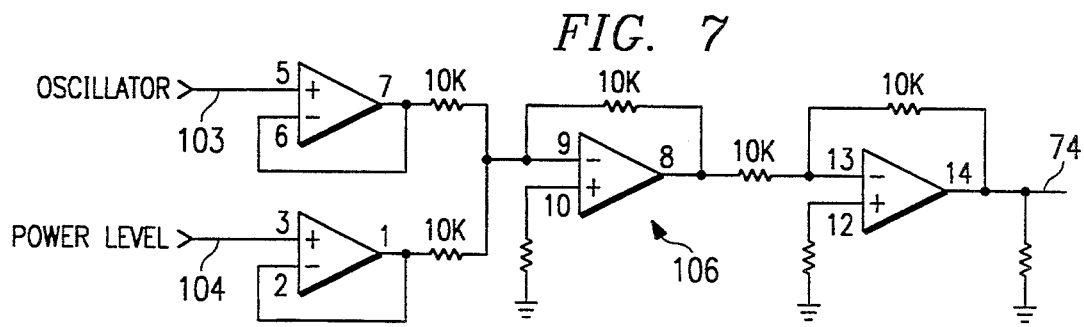
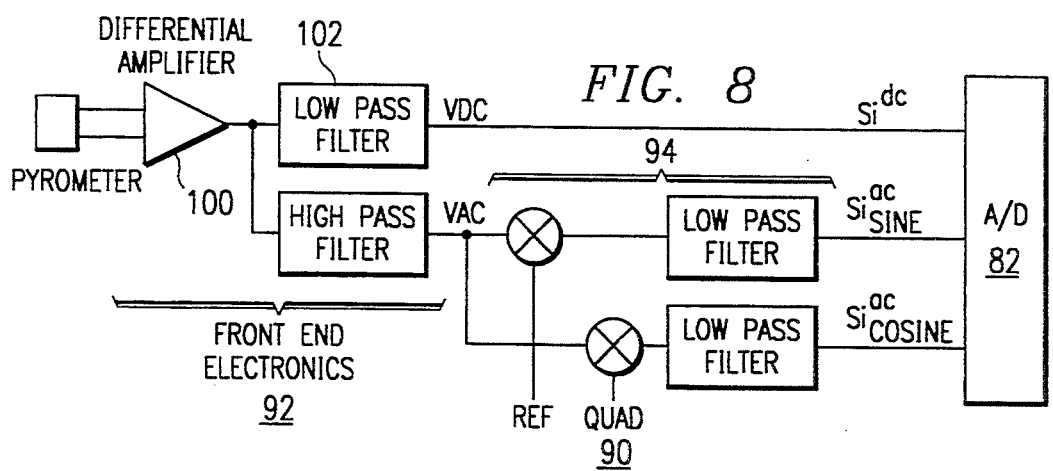
FIG. 8

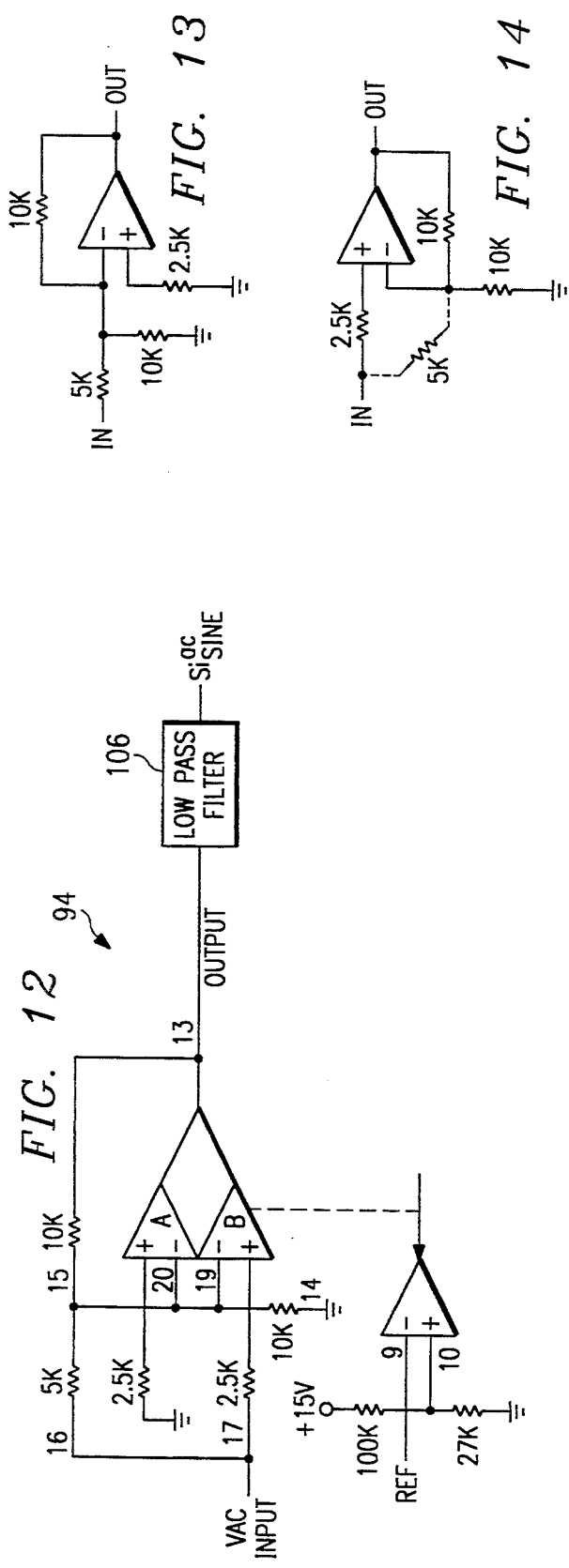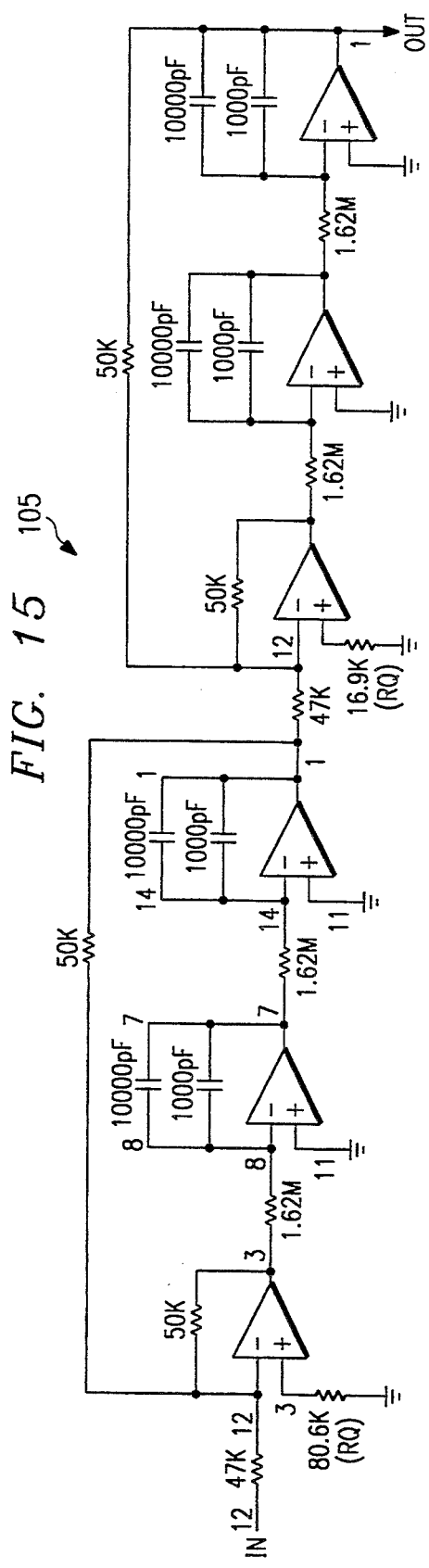

MULTI-ZONE LAMP INTERFERENCE CORRECTION SYSTEM

CROSS-REFERENCE TO RELATED APPLICATIONS

The following co-assigned patent applications are hereby incorporated herein by reference:

| Serial No. | Filing Date | TI Case No. |
|---|---|---|
| 08/114,550 | 08/31/93 | TI-15255B |
| 08/063,110 | 05/17/93 | TI-15256A |
| 07/973,362 | 11/09/92 | TI-16090 |
| 08/056,599 | 04/30/93 | TI-16991A |
|  |  | TI-17993 |

FIELD OF THE INVENTION

This invention generally relates to real-time sensors for semiconductor processing and more specifically to multi-zone lamp light interference correction for multi-point pyrometry temperature sensors.

BACKGROUND OF THE INVENTION

As semiconductor wafer processing moves toward the flexibility of single wafer processing, the ability to accurately measure and control the process and wafer state parameters becomes increasingly important. One of the most important parameters that need to be accurately monitored and controlled is temperature. Currently, a majority of thermally activated single wafer processes such as rapid thermal processes rely on pyrometric temperature measurements. An important limitation of pyrometric temperature measurement in semiconductor processing is that there is generally a spectral overlap between radiation from the heating lamps used to heat the wafer and the radiation from the wafer used to measure temperature. Both radiation from the lamps and radiation from the wafer used to measure temperature mostly overlap in the quartz transmission band. For instance, tungsten-halogen lamp radiation spectrum usually extends from less than 1 $\mu$m wavelength to less than 4 $\mu$m which is mostly in the transmission band (200 um to 3.5 $\mu$m) of thick quartz windows used in rapid thermal processing (RTP) systems. The pyrometer cannot distinguish between the radiation from the two (wafer and lamp) sources, and thus error is introduced into the temperature measurement. The error is particularly significant at lower wafer temperatures (e.g., at below 500° C.) during the temperature ramp-up and low-temperature processing where thermal radiation from the wafer is relatively small compared to lamp radiation. While lamp radiation introduces error at all temperatures up to the highest processing temperatures used in semiconductor processing, the effect of the radiation is particularly severe at lower temperatures.

SUMMARY OF THE INVENTION

A system and method for multi-zone lamp light interference correction for a rapid thermal processing (RTP) system with a multi-zone illuminator having a plurality of lamps arranged in a plurality of zones is disclosed. A set of geometry factors is determined for each zone. Then, the power supplies to the plurality of lamps are modulated synchronized to the line frequency. The radiance of a wafer is monitored using a first plurality of pyrometric temperature sensors. Each of the first plurality of temperature sensors generates an output signal contaminated with some lamp light interference. The modulation depth of said zones are monitored. In one embodiment, the radiance of a plurality of dummy lamps may also be monitored using a second plurality of temperature sensors called dummy pyrometry sensors. Each of the second plurality of temperature sensors generates a lamp radiance signal. A corrected wafer radiance is determined for each wafer sensor by removing the lamp interference components from the wafer sensor radiance signals. The lamp interference components are determined in real time based on the signals from the wafer (and dummy pyrometry sensors if used) as well as the predetermined geometrical factors.

An advantage of the invention is providing a multi-zone lamp interference correction system that measures the real-time lamp interference in each zone and provides wafer temperature values adjusted for lamp radiation effects from all heating lamp zones.

Another advantage on the invention is providing a multi-zone lamp interference correction system that uses the same type of pyrometric detectors to measure lamp interference and wafer radiation such that the spectral band for the interference detection is identical to the spectral band of the wafer radiance detection.

BRIEF DESCRIPTION OF THE DRAWINGS

In the drawings:

FIGS. 5–7 are schematic diagrams of the modulation circuit of the multi-zone lamp interference correction system of FIG. 4;

FIG. 8 is a schematic diagram of a front-end electronics of the multi-zone lamp interference correction system of FIG. 4;

FIGS. 12–14 are schematic diagrams of a demodulation circuit of the electronics of FIG. 8;

FIG. 15 is a schematic diagram of a Butterworth low pass filter of the demodulation circuit of FIGS. 12–14;

Corresponding numerals and symbols in the different figures refer to corresponding parts unless otherwise indicated.

DETAILED DESCRIPTION OF PREFERRED EMBODIMENTS

The preferred embodiment of the invention will be described in conjunction with a single-wafer Advanced Vacuum Processor (AVP) having an energy source adapted for rapid thermal processing (RTP). It will be apparent to those skilled in the art that the invention is equally applicable to other semiconductor fabrication equipment and single-wafer AVP configurations.

Figure 1:
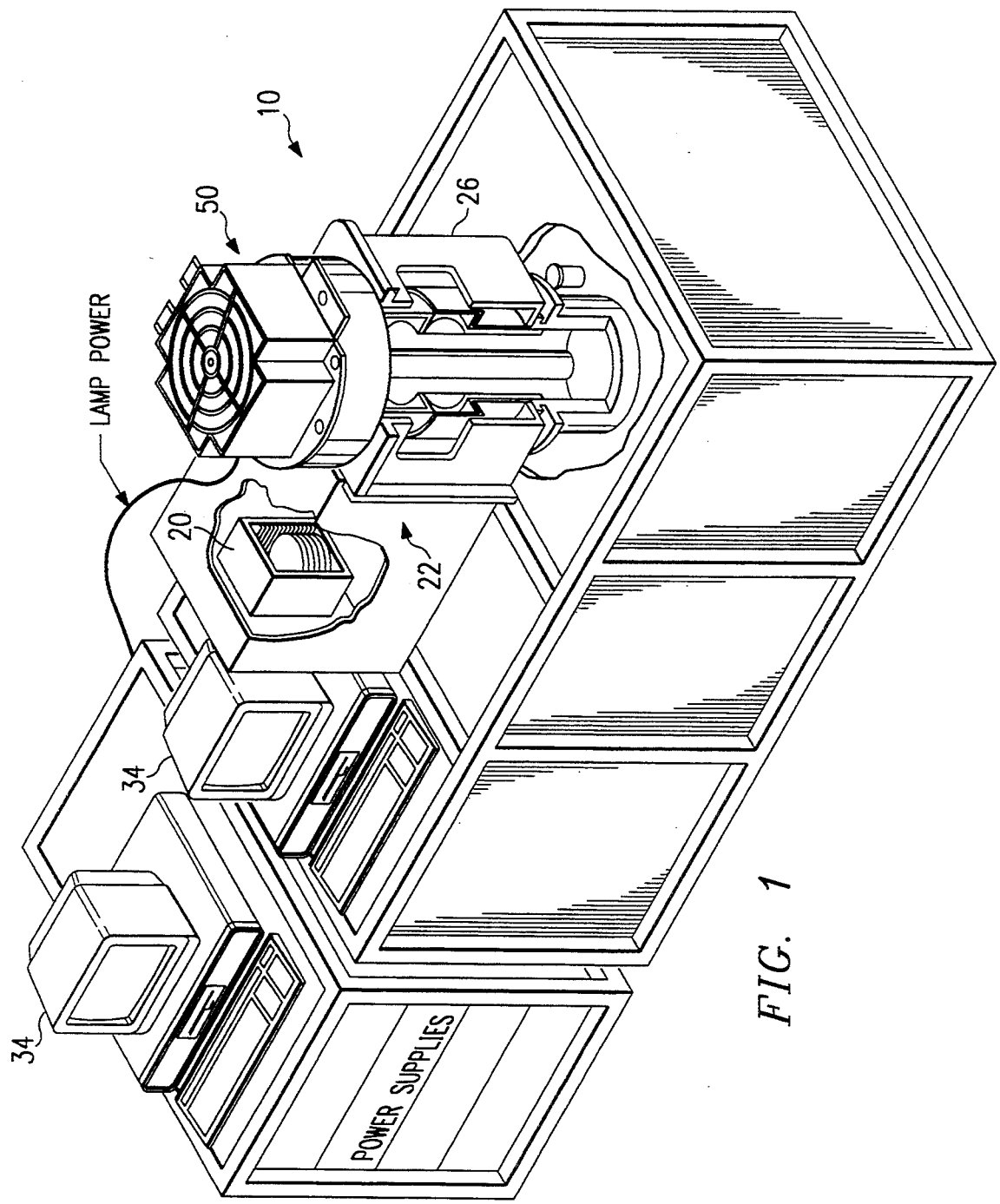
FIG. 1 is a diagram of an Advanced Vacuum Processing (AVP) system according to the invention.
Figure 2:
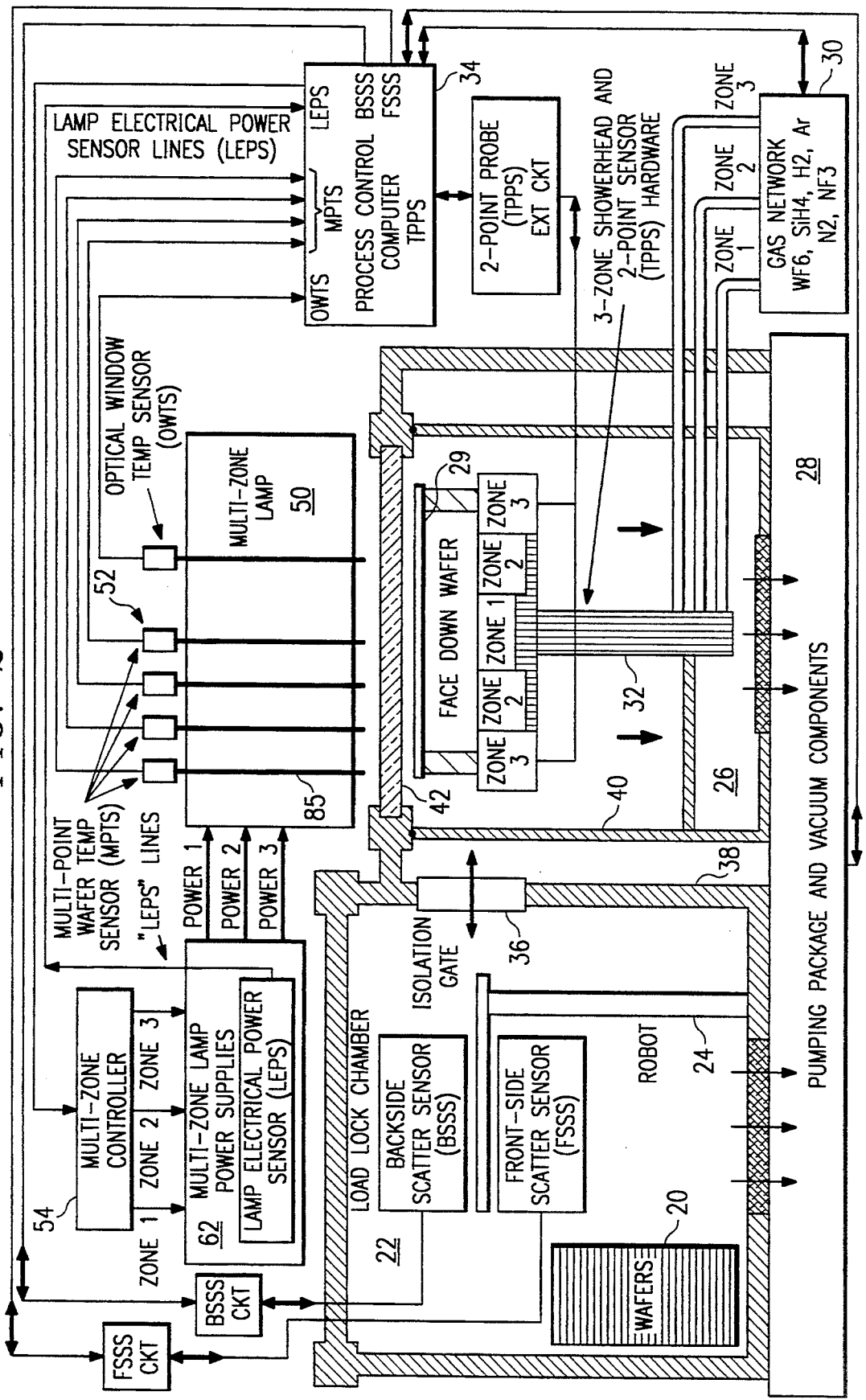
FIG. 2 is a block diagram of an RTP-AVP system with multi-point pyrometry sensors according to the invention.

As shown in FIGS. 1 and 2, the AVP machine 10, according to the invention, is a modular system that consists of a vacuum cassette 20, vacuum loadlock 22, robot handler 24, process chamber 26, vacuum pumping network 28, gas distribution network 30, gas injectors 32, and computer/electronics/software 34. The system typically occupies a footprint of 3 ft.×5 ft. and is approximately 4 ft. high. The vacuum cassette 20 may be constructed of machined aluminum with Tufram coating, and has a hinged door (not shown) for opening and losing under vacuum. The vacuum cassette 20 is typically placed under vacuum by pumping down vacuum loadlock 22, closing the hinged door, then venting the vacuum loadlock 22. The cassette 20 can then be removed under vacuum and moved to the next machine for wafer processing. The vacuum cassette 20 eliminates the need for super-clean rooms since wafers can be stored under vacuum and moved from machine to machine under vacuum.

The vacuum loadlock 22 may be constructed of anodized aluminum and house the vacuum cassette 20 and robot wafer handler 24. The robot wafer handler 24 has horizontal and vertical motion such that the wafer cassette 20 remains stationary. An isolation gate 36 is provided between the vacuum loadlock 22 and the process chamber 26 to maintain integrity for the process chamber 26, during manual insertion/removal of the vacuum cassette 20. The process chamber 26 may have a stainless steel outer chamber 38, and an inner chamber 40, made of various materials that depend on the process and sensor application. Typically, the inner chamber 40 consists of a quartz top window 42 and aluminum gas injector 32. Rapid thermal processes (RTPs) typically require a quartz window 42, quartz chamber liners within all-metal stainless steel chambers, and nickel-plated gas injectors. The inner process chamber 40 provides a small vacuum chamber inside a larger vacuum chamber and provides a symmetrical processing environment for the wafer 29 in process.

The gas distribution module 30 consist of mass-flow controllers (MFCs) housed in a safety-approved box with associated stainless steel plumbing to carry the process gasses to the process chamber 26 through point-of-use filters. The vacuum pumping network 28 typically consists of a "roughing" pump/blower module having a 250-cfm pumping capacity for the process chamber, a 60-cfm roughing pump for the loadlock 22,400–1000-l/sec turbo pumps for loadlock 22 and process chamber 26. Appropriate throttle valves and full-closure valves may be provided for automated pumping, pressure control, and venting.

The RTP may reactors employ multi-zone illuminators 50 with concentric heating zones and several in-situ sensors 52. One such multi-zone illuminator is described in U.S. patent application Ser. No. 870,446, filed Apr. 16, 1992, now U.S. Pat. No. 5,268,898 and assigned to Texas Instruments Incorporated and is hereby incorporated by reference. The multi-zone illuminators 50 are typically used in rapid thermal processes (anneals and chemical-vapor depositions) and consist of an array of concentric heating zones that provide infrared energy to the single wafer 29 through a quartz window 42. The specific reactor example shown in FIG. 2 is for a rapid thermal CVD tungsten (RTCVD-W) process. These RTP-AVP systems preferably employ high-performance multi-zone illuminators 50 with 4 axisymmetric zones for uniform 150-mm wafer heating. However, the number of zones may vary. Wafer processing and heating are performed face-down and from the backside, respectively. Power levels to the lamp zones can be adjusted in real time using a multi-zone controller 54 for optimum wafer temperature and process uniformity.

Figure 3:
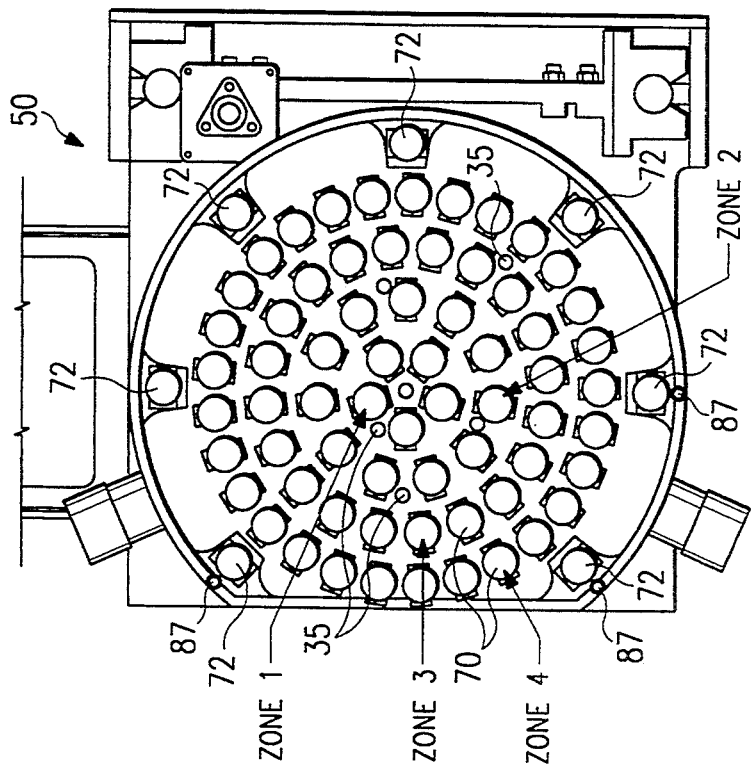
FIG. 3 is a cross-sectional view of a multi-zone axisymmetric illuminator according to the invention.

Referring to FIG. 3, multi-zone illuminator 50 consists of lamps 70 arranged in concentric circular rings or zones 1–4, dummy lamps 72, and hollow light-pipes 85 and 87 for multi-point pyrometry Each illuminator zone 1–4 is connected to a separate controllable power supply (not shown) along with at least one dummy lamp 72. The dummy lamps 72 are optically isolated from the wafer and heating lamps 70. The detector system consists of four pyrometric detectors 86 (shown in FIG. 4) that image four points on the wafer and four dummy detectors 84 (also shown in FIG. 4) that monitor the radiation from the dummy lamps 72. All eight detectors may, for example, comprise InAs pyrometric sensors that are sensitive at 3.3 $\mu$m. One such pyrometric sensor is described in co-pending U.S. patent application Ser. No. 07/973,362 filed Nov. 9, 1992, assigned to Texas Instruments, Inc. and hereby incorporated by reference. The radiation from each detection point on the wafer is imaged by a lens (not shown) and guided into the detector 86 through fluoride fiber light-pipes 85. The radiation from the dummy lamps 72 are guided into the dummy detectors 84 through light pipes 87 without lenses.

Figure 4:
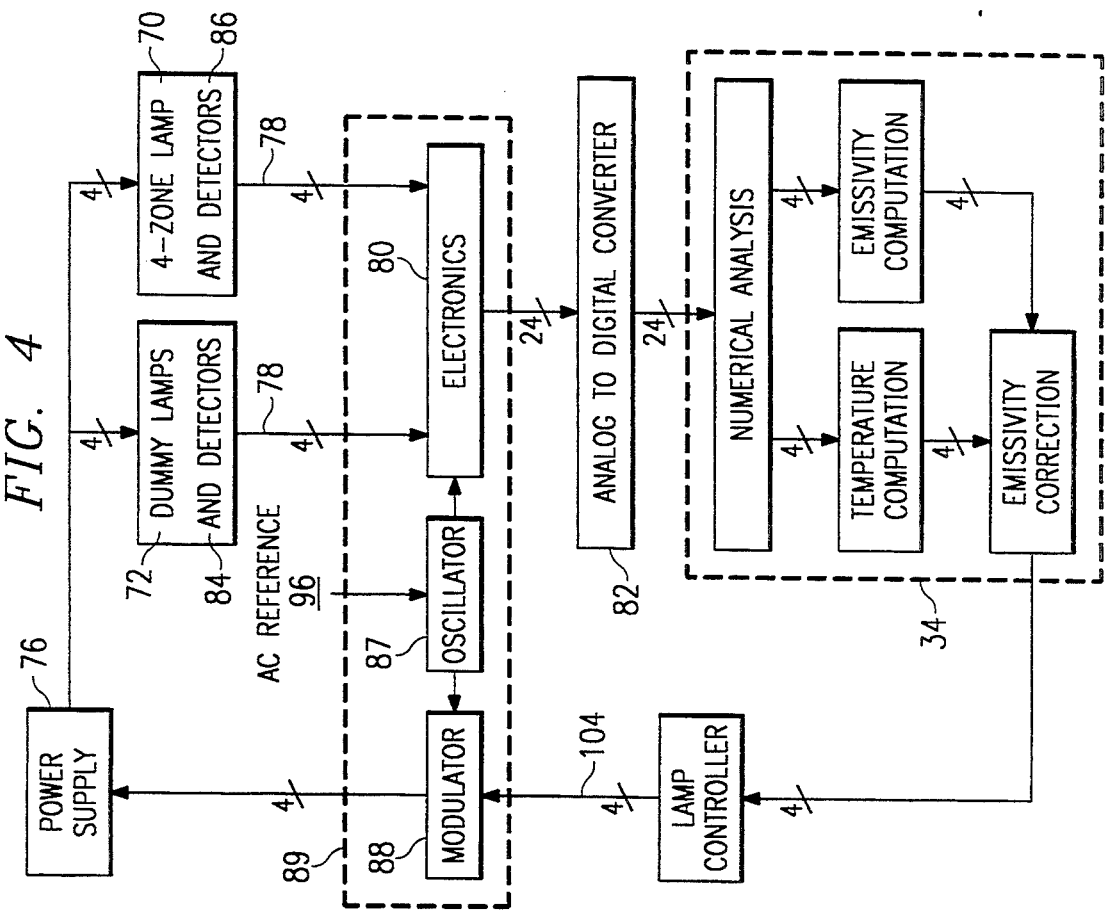
FIG. 4 is a block diagram of a multi-zone lamp interference correction system according to the invention.

FIG. 4 illustrates the principle of operation of a four zone Lamp Interference Correction System. Each of the four zones has a dummy lamp 72 which is given the same electrical input as the lamps 70 used for wafer heating. The lamp control signal 74 into the power supply 76 of each lamp zone 1–4 is modulated at 30 Hz synchronized to the AC line that drives the lamp power supply. Because the optical modulation depth is a nonlinear function of the lamp power level, the modulation levels out of the lamps 70 in each zone must be monitored continuously. This is accomplished with dummy detectors 84 which monitor the radiation from the four dummy lamps 72. The detectors 86 used to measure the wafer radiance image four points on the wafer using lenses. The lensed detectors 86 receive the combination of the radiation from the wafer and the lamps 70 and the detected signals 78 are processed by an electronic circuit 80. The processed signals are then digitized by A/D converter 82 and sent to a computer 34 for digital signal processing. Because the radiation outputs from the lamps 70 are modulated, they can be separated from the wafer radiance using real-time numerical techniques. The resulting wafer radiance values corrected for lamp interference are then used to measure wafer temperature.

The oscillator 87 and modulator 88 make up modulation circuit 89. An example of a modulation circuit 89 is shown in detail in FIGS. 5, 6, & 7. The modulation circuit 89 takes in a line voltage 96 stepped down by a transformer 98 as shown in FIG. 5. The output of transformer 98 is applied to a 30 Hz square wave generator as shown in FIG. 6. Both the phase and amplitude of the square wave modulating signal can be varied. The output signal 103 of the 30 Hz square wave generator is added to the dc lamp control signal 104 in circuit 106 shown in FIG. 7 to produce a modulated lamp control signal 74. The lamp control signals 74 are used to switch the SCRs (not shown) that control the lamp intensity.

Referring to FIG. 8, the electronics 80 of FIG. 4 can be separated into three parts: the quadrature reference generator circuit 90, the front-end differential amplifier circuit 92, and the demodulation circuit 94.

Figure 9:
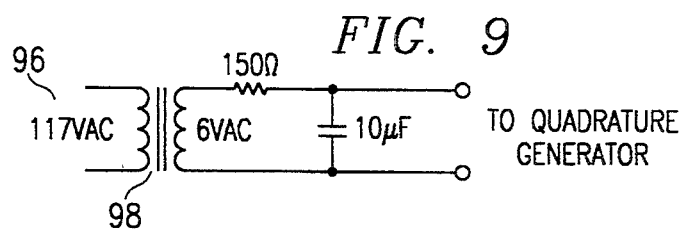
FIGS. 9–10 are schematic diagrams of a quadrature signal generator circuit of the multi-zone lamp interference correction system of FIG. 4.
Figure 10:
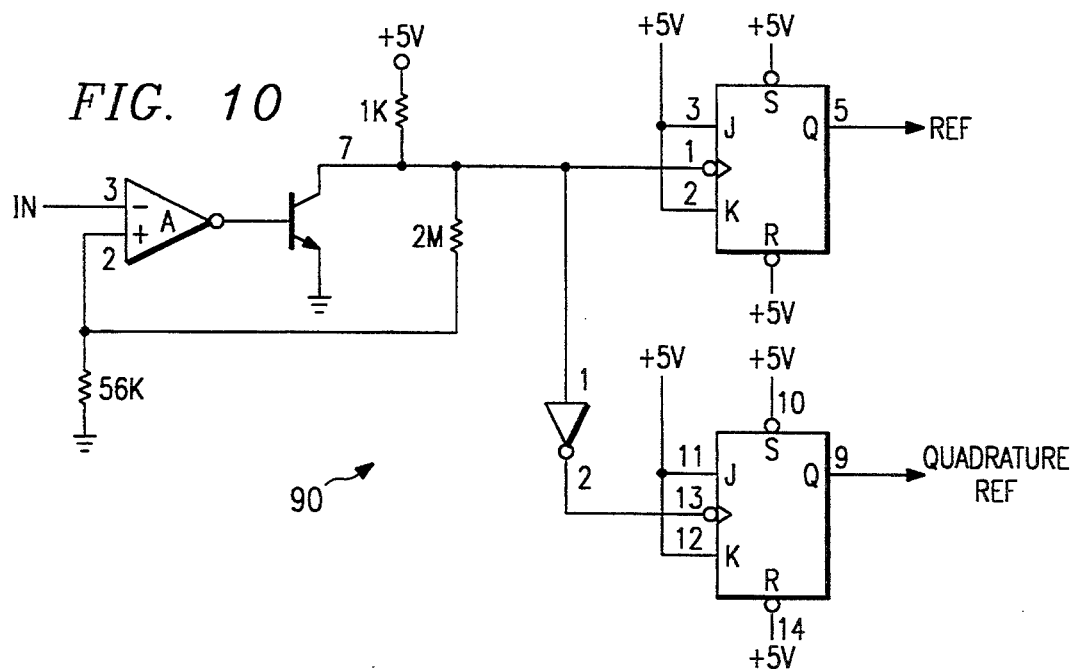

The quadrature signal generator 90 takes the same reference line signal 96 that the modulation circuit 89 uses and produces two TTL level square waves, ref and quad, 90° apart. One circuit for accomplishing this is shown in FIGS. 9 & 10. Other methods will be apparent to those skilled in the art.

Figure 11:
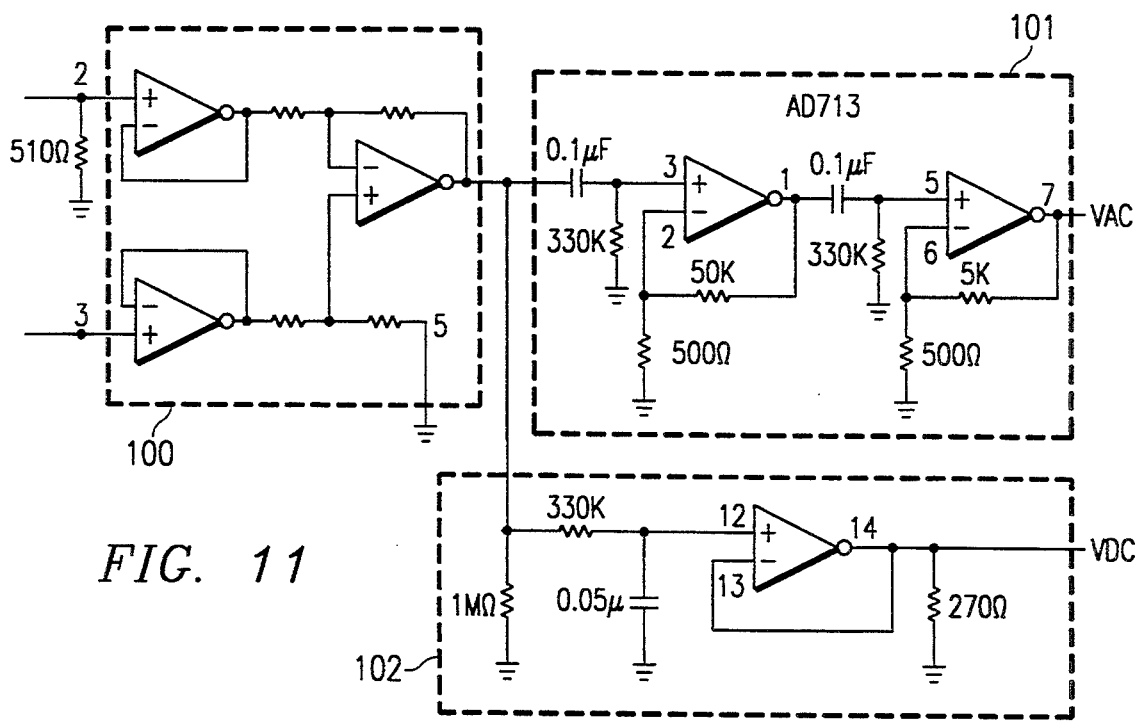
FIG. 11 is a schematic diagram of front end electronics of the electronics of FIG. 8.

The front-end differential amplifier 92 (FIG. 11) is the most critical electronic circuit in terms of maintaining high signal to noise. The output of each InAs detector channel (84, 86) is amplified differentially 100, eliminating common mode noise. The dc component of the detector signal (signals with frequencies less than 10 Hz) is simply buffered 102 and connected to the A/D converter 82. The ac component of the signal (signals with frequencies larger than 5 Hz) is amplified 60 dB in two separate stages (101) and is connected to the input of the demodulation circuit 94. Referring to FIG. 12, the demodulation circuit 94 takes the ac component of the detected signal (with a large 30Hz component) and demodulates it with the reference signal ref from the quadrature signal generator 90. FIGS. 13 & 14 show an equivalent schematic of demodulation circuit 94 with A switched on and B switched on, respectively. The signal is then passed through a 4-pole Butterworth filter 105 with a 9 Hz 3 dB point (FIG. 15). The output of the filter provides the signal proportional to the amplitude of the modulated signal multiplied by the sine of the phase of the signal. An identical demodulation circuit as that of FIG. 12 demodulates the same signal using the quadrature signal quad as its reference. The output of this section of the circuit provides a signal proportional to the amplitude of the modulated signal multiplied by the cosine of the phase. The sine and cosine proportional signals are applied to the A/D converter 82.

The analog to digital (A/D) converter 82 provides the following 24 digitized signals from the four lensed wafer detectors and the four dummy lamp detectors 84 at a data rate of 10 Hz.

DC components of the lensed detectors ($S_i^{dc}$) (4 signals)

AC components of the lensed detectors ($S_i^{ac}\sin\phi, S_i^{ac}\cos\phi_{Si}$) (8 signals)

DC components of the dummy detectors ($D_i^{dc}$) (4 signals)

AC components of the dummy detectors ($D_i^{ac}\sin\phi_{Di}, D_i^{ac}\cos\phi_{Di}$)(8 signals) i=1.4 for each zone.

The preferred RTP lamp design allows for four independently controllable zones for 150-mm wafer processing. There are also four pyrometric detectors 86 that measure the temperature of the wafer at four points of the wafer corresponding to locations from center to edge. Although the detection of wafer radiation is localized within the point imaged by the lens, lamp interference detected by a particular sensor is a weighted combination of the lamp radiation from the four heating zones. Because the lamp radiation in each of the four zones can be controlled independently, the relative lamp radiation contribution from each of the four zones must be measured and calibrated. The relative contribution of lamp radiation from zone i into detector j is termed $g_{ij}$ and is a function of the reactor and lamp assembly geometry. In terms of the lamp-detector interaction, the reactor can be described in full by a matrix G, containing the geometry factors, $g_{ij}$.

We thus define, G:

$$G = \begin{bmatrix} g_{11} & g_{12} & g_{13} & g_{14} \\ g_{21} & g_{22} & g_{23} & g_{24} \\ g_{31} & g_{32} & g_{33} & g_{34} \\ g_{41} & g_{42} & g_{43} & g_{44} \end{bmatrix} \quad (1)$$

The geometry factors are obtained during a calibration run one column at a time. In order to determine the geometry factors, the effect of lamp radiation in a particular zone on each of the four detectors needs to be measured. This can be done by turning on the lamps in one zone and measuring the relative signal at each of the detectors. Because this would result in unacceptable temperature non-uniformity in the wafer with resulting non-uniformities in regional reflectivity, a method based on modulation is used. In this method, the lamps in each zone is turned on to achieve uniform temperature across the wafer at about 550° C. One zone is then modulated, and the ac component in the four detectors are measured to obtain the relative susceptibility of the detectors to the given lamp zone. In obtaining the first column, $g_{i1}$, for example, the lamps are held at a power setting to maintain a 550° C. wafer temperature in all four zones. Modulation is provided in zone one only, and the resulting ac components of radiation in zone 1 to detector j is then the ratio of the amplitude of ac radiation in detector j divided by the amplitude of ac radiation from the lamps in zone 1 as monitored by the dummy lamp detector. Thus, $$g_{11} = \frac{\sqrt{S_1^{ac2}\cos^2\phi_{S1} + S_1^{ac2}\sin^2\phi_{S1}}}{\sqrt{D_1^{ac2}\cos^2\phi_{D1} + D_1^{ac2}\sin^2\phi_{D1}}} = \frac{S_1^{ac}}{D_1^{ac}} \quad (2)$$

$$g_{12} = \frac{\sqrt{S_2^{ac2}\cos^2\phi_{S2} + S_2^{ac2}\sin^2\phi_{S2}}}{\sqrt{D_1^{ac2}\cos^2\phi_{D1} + D_1^{ac2}\sin^2\phi_{D1}}} = \frac{S_2^{ac}}{D_1^{ac}} \quad (3)$$

$$g_{31} = \frac{\sqrt{S_3^{ac2}\cos^2\phi_{S3} + S_3^{ac2}\sin^2\phi_{S3}}}{\sqrt{D_1^{ac2}\cos^2\phi_{D1} + D_1^{ac2}\sin^2\phi_{D1}}} = \frac{S_3^{ac}}{D_1^{ac}} \quad (4)$$

$$g_{41} = \frac{\sqrt{S_4^{ac2}\cos^2\phi_{S4} + S_4^{ac2}\sin^2\phi_{S4}}}{\sqrt{D_1^{ac2}\cos^2\phi_{D1} + D_1^{ac2}\sin^2\phi_{D1}}} = \frac{S_4^{ac}}{D_1^{ac}} \quad (5)$$

In general, with lamp modulation in zone j only, $$g_{ij} = \frac{S_i^{ac}}{D_j^{ac}} \quad (6)$$

Figure 16:
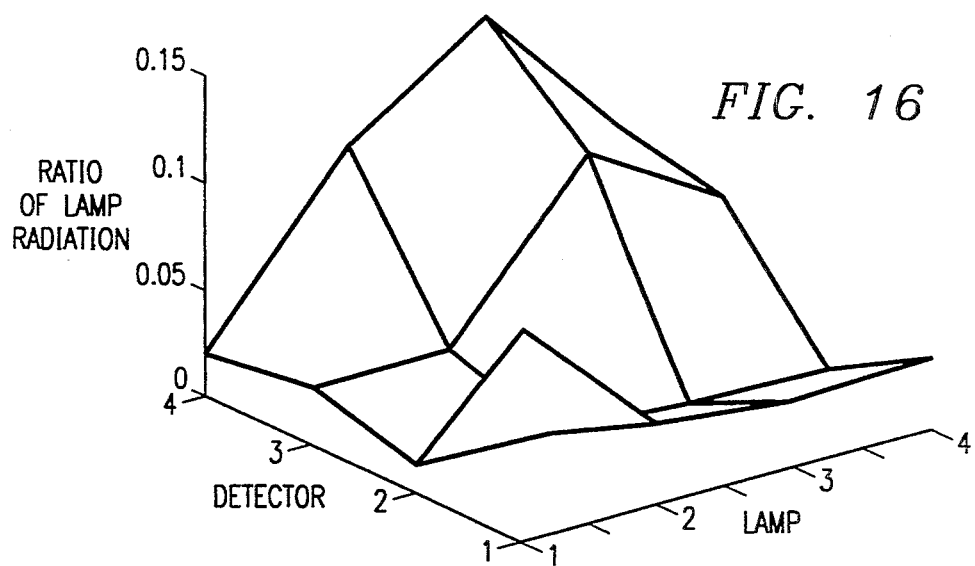
FIG. 16 is a graph of measured geometry parameters in a 4-zone illuminator.

An example of a mesh plot of the geometry factor is presented in FIG. 16.

The four zone lamp interference correction system can then be represented by the following system of equations $$S_i^{ac}\cos\phi_{Si} = \alpha_i \sum_{j=1}^{4} g_{ij}D_j^{ac}\cos\phi_{Dj} \quad (7)$$

$$S_i^{ac}\sin\phi_{Si} = \alpha_i \sum_{j=1}^{4} g_{ij}D_j^{ac}\sin\phi_{Dj} \quad (8)$$

$$S_i^{dc} = W_i + \alpha_i \sum_{j=1}^{4} g_{ij}D_j^{dc} \quad (9)$$

The $\alpha_i$ parameter are measurements of wafer reflectivity. The $W_i$ variables are the adjusted wafer radiance values.

In order to fully understand the significance of the various variables, an understanding of the different components of radiation seen by each detector is required. The dummy detectors are placed in a controlled and optically isolated environment and thus see radiation that can be separated into two components. One is the dc component of the lamp radiation ($D_i^{dc}$) and the other is ac component of the lamp radiation ($D_i^{ac}$). The radiation detected by the lensed detectors, however, can be separated into many components. For the detector in zone i, there are the dc component of radiation from zones j=1 to 4, as well as the wafer radiance (dc component only) from zone i. The level of the detected signal are dependent on four factors; 1.) The intensity of the lamp radiation (proportional to $D_j$), 2.) The geometry factor which is the relative efficiency of radiation channeled from zone j to detector i, ($g_{ij}$), 3.) the temperature dependent wafer reflectivity affecting detector in zone i ($\alpha_i$), and 4.) thermal radiation from the wafer.

In order for the system of 12 equations to correctly model the radiation dynamics of the AVP chamber the following assumptions need to be made.

1) Since the power delivered to dummy lamp i is identical to the power delivered to lamps in zone i, the radiation emitted from dummy lamp i is assumed to be proportional to the radiation emitted from zone i.
2) Since the thermal time constants of the silicon wafer is much larger than 1/30 sec, the 30 Hz ac component radiation detected by both the dummy and lensed detectors are assumed to be proportional to the level of radiation from lamp radiation only.
3) The geometry parameters $g_{ij}$ are assumed to be a function of the chamber and wafer geometry and are assumed to be independent of temperature (changes due to wafer reflectivity is assigned to $\alpha_i$). In addition, the geometry parameters are assumed to be equal for both dc and ac components of lamp radiation.

Equations 7, 8 and 9 consists of an over determined system of 12 equations and 8 unknowns. Because of the consistent structure of the equations, however, the 12×8 least squares problem can be broken down into four 2×1 systems. The numerical solution solves for $\alpha_i$ from equations 7 and 8 using four 2×1 least squares solutions.

$$\alpha_i = \frac{S_i^{ac}\cos\phi_{si}\sum_{j=1}^{4} g_{ij}D_j^{ac}\cos\phi_{Dj} + S_i^{ac}\sin\phi_{si}\sum_{j=1}^{4} g_{ij}D_j^{ac}\sin\phi_{Dj}}{\left(\sum_{j=1}^{4} g_{ij}D_j^{ac}\cos\phi_{Dj}\right)^2 + \left(\sum_{j=1}^{4} g_{ij}D_j^{ac}\sin\phi_{Dj}\right)^2} \quad (10)$$

Given the values of $\alpha_i$, equation 9 is solved for the values of $W_i$.

$$W_i = S_i^{dc} - \alpha_i \sum_{j=1}^{4} g_{ij}D_j^{dc} \quad (11)$$

The $W_i$ variables represent the wafer radiance corrected for lamp interference.

Figure 17:
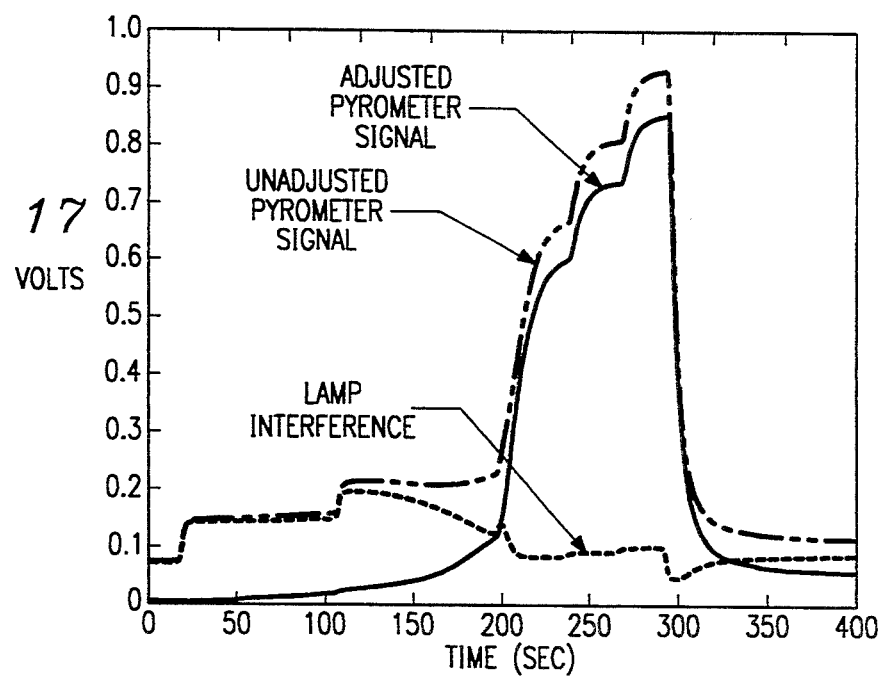
FIG. 17 is a graph of an unadjusted pyrometer signal, lamp interference component, and an adjusted pyrometer signal.

FIG. 17 illustrates lamp interference correction for a variable step power into the lamps. In the unadjusted pyrometer curve, two step changes at the lower temperatures can be seen. During both step changes, the temperature of the wafer is below 400° C. where limited thermal radiation from the wafer is expected. The unadjusted pyrometer signal picks up the fairly large radiation from the lamps while the corrected pyrometer signal does not respond to the lamp power step changes until the wafer itself begins emit radiation. The fact that the two step changes are exactly compensated for indicates that lamp interference correction is effective in removing the error source.

Figure 18:
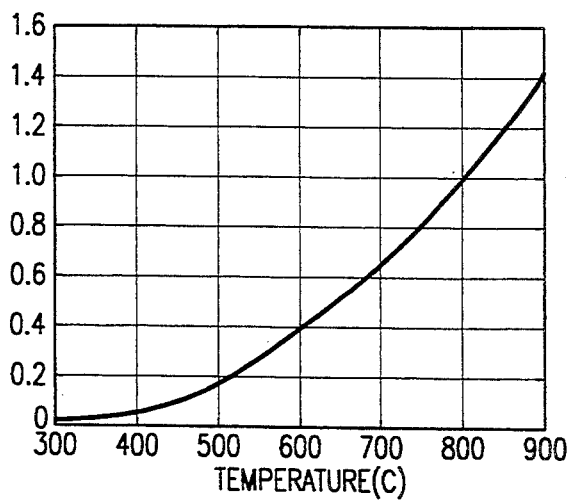
FIG. 18 is a graph of corrected wafer radiance versus thermocouple reference temperature.

Having obtained the lamp interference corrected wafer radiance, a lookup table relating wafer temperature with corrected wafer radiance can be built by performing a calibration run with a thermocouple wafer. FIG. 18 illustrates the relationship between corrected wafer radiance and wafer temperature in one of the InAs detector channels.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for multi-zone lamp interference correction for a multi-zone illuminator having a plurality of lamps arranged in a plurality of zones, comprising the steps of:
   a. determining, for each of said plurality of zones, a relative efficiency of radiation factor from each of said plurality of zones;
   b. modulating a plurality of power sources synchronized to a line frequency and connected to said plurality of zones;
   c. monitoring the radiance of a wafer using a first plurality of pyrometric temperature sensors, wherein each of said first plurality of temperature sensors generates an output signal;
   d. monitoring the modulation depths of said zones;
   e. determining a corrected wafer radiance for each wafer temperature sensor by removing a lamp interference component from at least a portion of one of the output signals, wherein said lamp interference component is based on at least one of said relative efficiency of radiation factors.

2. The method of claim 1 wherein said step of monitoring the modulation depth comprises the step of monitoring the radiance of a plurality of dummy lamps using a second plurality of pyrometric temperature sensors, wherein each of said second plurality of temperature sensors generates a lamp radiance signal.

3. The method of claim 2, wherein said step of determining said relative efficiency of radiation factors comprises the steps of:
   a. supplying power to said plurality of lamps;
   b. modulating the power to one of said zones;
   c. determining the amplitude of the ac component of each of said output signals;
   d. determining the amplitude of the ac component of said lamp radiance signal for said one zone;
   e. for said one zone, dividing each of said ac components of said wafer radiance signals by said ac component for said lamp radiance signal for said one zone to obtain said relative efficiency factors for said one zone; and
   f. repeating steps b through e for each of said zones.

4. The method of claim 1, wherein said first and second pluralities of temperature sensors comprise indium-arsenic pyrometers.

5. The method of claim 2, wherein said step of determining said corrected wafer radiance comprises the steps of:
   a. separating each of said output signals and said lamp radiance signals into a dc component, an ac sine component, and an ac cosine component wherein said ac sine and cosine components can be converted to ac amplitude and phase components;
   b. determining the wafer reflectivity for each zone; and
   c. calculating said corrected wafer radiance for each zone according to the formula:

$$W_i = S_i^{dc} - \alpha_i \sum_{j=1}^{n} g_{ij} D_j^{dc}$$

wherein:
   $W_i$ is the corrected wafer radiance for the ith zone;
   $S_i^{dc}$ is the dc component of the output signal for the ith zone;
   $\alpha_i$ is the wafer reflectivity for the ith zone;
   n is the number of zones;
   $g_{ij}$ is the relative efficiency of radiation for the jth zone from the ith detector; and
   $D_j^{dc}$ is the dc component of the lamp radiance signal for the jth zone.

6. The method of claim 1, wherein said plurality of zones comprises four zones.

7. The method of claim 5, wherein said dc components, ac sine components, and ac cosine components are digital signals.

8. A method for multi-zone lamp interference correction, comprising the steps of:
   a. determining a plurality of geometry factors for each of a plurality of heating zones;
   b. modulating a plurality of power sources connected to said plurality of heating zones;
   c. monitoring a wafer using a first plurality of pyrometry sensors, wherein each of said first plurality of pyrometry sensors generates a wafer based signal;
   d. monitoring a plurality of dummy lamps using a second plurality of pyrometry sensors, wherein each of said second plurality of pyromerry sensors generates a lamp based signal;
   e. separating each of said wafer and lamp based signals into adc component, an ac sine component, and an ac cosine component, wherein said ac sine and cosine components can be converted to ac amplitude and phase components;
   f. digitizing each of said dc & ac components;
   g. determining the wafer reflectivity for each zone; and
   h. determining a corrected wafer radiance for each zone for lamp interference based on one of said digitized dc components associated with said first plurality of pyromerry sensors, said wafer reflectivity, said geometry factors and said digitized dc component associated with said second plurality of pyrometry sensors.

9. The method of claim 8, wherein said step of determining said plurality of geometry factors comprises the steps of:
   a. supplying power to said plurality of heating zones;
   b. modulating the power to one of said heating zones;
   c. determining the ac component of each of said wafer based signals;
   d. determining the ac component of said lamp based for said one zone;
   e. for said one zone, dividing each of said ac components of said wafer based signals by said ac component for said lamp based signal for said one zone to obtain said geometry factors for said one zone; and
   f. repeating steps b through e for each of said heating zones.

10. The method of claim 8, wherein said pyrometry sensor comprises a indiumarsenide pyrometer.

11. The method of claim 8, wherein said step of determining said corrected wafer radiance comprises the steps off
   a. calculating said corrected wafer radiance for each zone according to the formula:

$$W_i = S_i^{dc} - \alpha_i \sum_{j=1}^{n} g_{ij} D_j^{dc}$$

wherein:
   $W_i$ is the corrected wafer radiance for the ith zone;
   $S_i^{dc}$ is the dc component of the wafer based signal for the ith zone;
   $\alpha_i$ is the wafer reflectivity for the ith zone;
   n is the number of heating zones;
   $g_{ij}$ is the geometry factor for the jth zone from the ith detector; and
   $D_j^{dc}$ is the dc component of the lamp based signal for the jth zone.

12. The method of claim 8, wherein said plurality of heating zones comprises four heating zones.

13. A system for multi-zone lamp interference correction of a processing chamber, comprising:
   a. a first plurality of lamps arranged in a plurality of lamp zones and operable to heat a wafer;
   b. a second plurality of lamps isolated from said wafer, wherein one of said second plurality of lamps is located in each of said lamp zones;
   c. a first plurality of pyrometry sensors operable to monitor said wafer and supply a wafer based signal for each of said lamp zones, wherein one of said first plurality of pyrometry sensors is located in each of said lamp zones;

d. a second plurality of pyrometry sensors operable to monitor the radiance of said second plurality of lamps and supply a lamp radiance signal for each of said zones;

e. a modulation circuit operable to modulate power supplied to said plurality of lamp zones;

f. circuitry connected to said first and second pluralities of pyromerry sensors, said circuitry operable to receive said wafer based signals and said lamp radiance signals and to remove a lamp interference factor from at least a portion of one of the wafer based signals, wherein said lamp interference factor is based on the geometry of the processing chamber and at least a portion of at least one of the lamp radiance signals.

14. The system of claim 13, wherein said circuitry is also operable to separate each of said wafer based signals and lamp radiance signals into associated dc, ac sine and ac cosine components; wherein said ac sine and cosine components can be converted to ac amplitude and phase components.

15. The system of claim 14, wherein said circuitry comprises:

a. a transformer connected to a line voltage and operable to supply a stepped down voltage;

b. a differential amplifier connected to said first and second pluralities of pyrometry sensors;

c. a low pass filter connected to said differential amplifier for generating said dc component;

d. a high pass filter connected to said differential amplifier for generating an ac component;

e. a first demodulation circuit connected to said high pass filter for generating said ac sine component; and f. a second demodulation circuit connected to said high pass filter for generating said ac cosine component.

16. The system of claim 13, wherein said portion of said wafer based signal is a dc component and said at least a portion of at least one of the lamp radiance signals is adc component 17. The system of claim 13 wherein said plurality of lamp zones comprises four lamp zones.

18. The system of claim 13 wherein said circuitry comprises an analog to digital converter for digitizing said wafer based signals and said lamp radiance signals.

* * * * *